United States Patent
Aiken

(10) Patent No.: US 7,025,686 B1
(45) Date of Patent: Apr. 11, 2006

(54) AXIALLY COLLAPSIBLE DRIVESHAFT ASSEMBLY

(75) Inventor: Albert Aiken, Toledo, OH (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/454,715

(22) Filed: Jun. 4, 2003

(51) Int. Cl.
*F16C 3/03* (2006.01)

(52) U.S. Cl. .................................. 464/162; 464/183

(58) Field of Classification Search ............. 464/162, 464/183, 146, 167, 169; 72/284; 188/374; 74/492, 493; 280/777
See application file for complete search history.

(56) References Cited

U.S. PATENT DOCUMENTS

| | | | |
|---|---|---|---|
| 3,454,397 A * | 7/1969 | Sato et al. ..................... 74/492 |
| 3,508,633 A * | 4/1970 | Nishimura et al. ....... 74/493 X |
| 3,717,046 A | 2/1973 | Takao et al. |
| 3,779,591 A | 12/1973 | Rands |
| 3,903,982 A | 9/1975 | Van Winsen et al. |
| 4,019,403 A | 4/1977 | Kondo et al. |
| 4,643,448 A * | 2/1987 | Loren ......................... 280/777 |
| 4,674,354 A | 6/1987 | Brand |
| 4,995,486 A * | 2/1991 | Garneweidner ............. 188/374 |
| 5,118,214 A | 6/1992 | Petrzelka et al. |
| 5,222,915 A | 6/1993 | Petrzelka et al. |
| 5,320,579 A | 6/1994 | Hoffmann |
| 5,443,146 A | 8/1995 | Ayyildiz et al. |
| 5,651,738 A * | 7/1997 | Jacob et al. ............ 464/167 X |
| 6,190,263 B1 * | 2/2001 | Kimoto et al. |
| 6,217,456 B1 * | 4/2001 | Jacob ......................... 464/167 |
| 6,293,872 B1 * | 9/2001 | Ganser ................... 464/183 X |
| 6,467,836 B1 * | 10/2002 | Miller et al. ............ 280/777 X |
| 6,692,365 B1 * | 2/2004 | Suzuki et al. ............... 464/162 |
| 6,802,781 B1 * | 10/2004 | Schwarzler et al. ........ 464/167 |
| 6,837,091 B1 * | 1/2005 | Brochheuser et al. ..... 72/284 X |

FOREIGN PATENT DOCUMENTS

JP 52-49535 * 4/1977 ................... 74/492

* cited by examiner

*Primary Examiner*—Greg Binda
(74) *Attorney, Agent, or Firm*—MacMillan, Sobanski & Todd, LLC

(57) ABSTRACT

A driveshaft assembly that is axially collapsible in a reliably controlled manner includes a male splined slip yoke that cooperates with a female splined transition member for concurrent rotational movement and for relative axial movement. The transition member is, in turn, secured to a hollow cylindrical driveshaft tube. The transition member has an inner surface that tapers or otherwise extends radially inwardly, and a wedge is supported within the transition member. When a large compressive force is applied to the ends of the driveshaft assembly, the slip yoke causes the wedge to move axially relative to the transition member, thereby causing the transition member and a portion of the hollow cylindrical driveshaft tube to be expanded radially outwardly and creating a weakened region. When the wedge is moved yet axially further relative to the transition member, the driveshaft tube is further deformed in a controlled and consistent, thereby absorbing energy from the collision. Optionally, a bladder may be provided within the hollow cylindrical driveshaft tube and filled with a material so as to allow the amount of compressive force that is required to cause the driveshaft assembly to axially collapse to be varied.

26 Claims, 2 Drawing Sheets

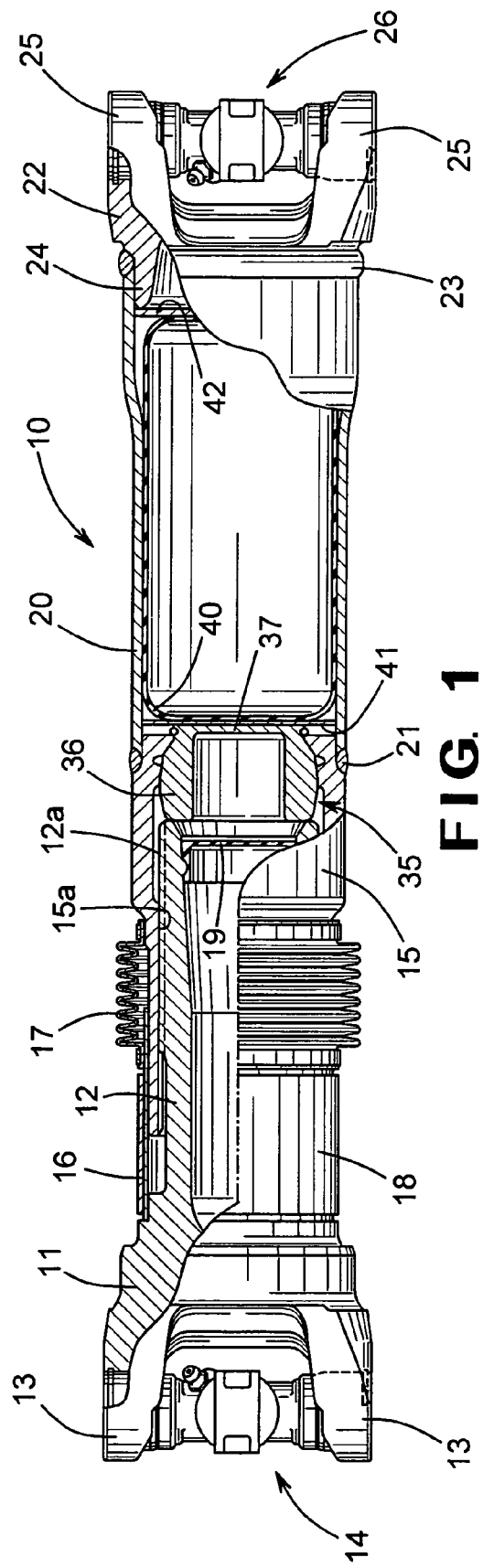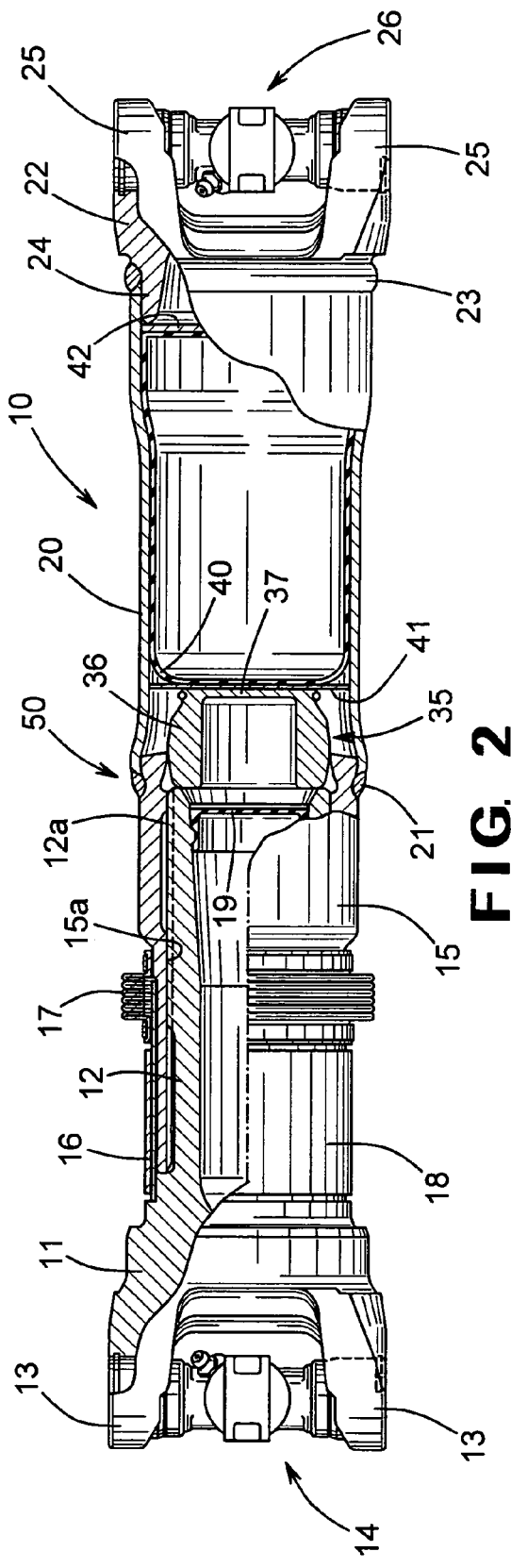

AXIALLY COLLAPSIBLE DRIVESHAFT ASSEMBLY

BACKGROUND OF THE INVENTION

This invention relates in general to drive train systems for transferring rotational power from a source of rotational power to a rotatably driven mechanism. In particular, this invention relates to an improved structure for a driveshaft assembly, such as for use in a vehicular drive train system, that is axially collapsible in a reliably controlled manner in the event of a collision.

Torque transmitting shafts are widely used for transferring rotational power from a source of rotational power to a rotatably driven mechanism. For example, in most land vehicles in use today, a drive train system is provided for transmitting rotational power from an output shaft of an engine/transmission assembly to an input shaft of an axle assembly so as to rotatably drive the wheels of the vehicle. To accomplish this, a typical vehicular drive train system includes a hollow cylindrical driveshaft tube. A first universal joint is connected between the output shaft of the engine/transmission assembly and a first end of the driveshaft tube, while a second universal joint is connected between a second end of the driveshaft tube and the input shaft of the axle assembly. The universal joints provide a rotational driving connection from the output shaft of the engine/transmission assembly through the driveshaft tube to the input shaft of the axle assembly, while accommodating a limited amount of misalignment between the rotational axes of these three shafts.

A recent trend in the development of passenger, sport utility, pickup truck, and other vehicles has been to design the various components of the vehicle in such a manner as to absorb energy during a collision, thereby providing additional safety to the occupants of the vehicle. As a part of this trend, it is known to design the drive train systems of vehicles so as to be axially collapsible. To accomplish this, the driveshaft tube may be formed as an assembly of two or more components that are connected together for concurrent rotational movement during normal operation, yet which are capable of moving axially relative to one another when a relatively large axially compressive force is applied thereto, such as can occur during a collision. A variety of such axially collapsible driveshaft assemblies are known in the art. However, in known axially collapsible driveshaft assemblies, it has been found to be relatively difficult to reliably control the manner in which the axially collapsing movement of the driveshaft assembly occurs. Thus, it would be desirable to provide an improved structure for a driveshaft assembly, such as for use in a vehicular drive train system, that is axially collapsible in a reliably controlled manner in the event of a collision.

SUMMARY OF THE INVENTION

This invention relates to an improved structure for a driveshaft assembly, such as for use in a vehicular drive train system, that is axially collapsible in a reliably controlled manner in the event of a collision. The driveshaft assembly includes a male splined slip yoke that cooperates with a female splined transition member so as to be connected together for concurrent rotational movement and for relative axial movement. The transition member is, in turn, secured to a hollow cylindrical driveshaft tube. The transition member has an inner surface that tapers or otherwise extends radially inwardly, and a wedge is supported within the transition member. When a large compressive force is applied to the ends of the driveshaft assembly, such as might occur during a collision, the slip yoke is initially moved axially within the transition member until the end thereof abuts the wedge. Further axial movement of the slip yoke relative to the transition member causes the wedge to move axially also relative to the transition member, thereby causing the transition member and a portion of the hollow cylindrical driveshaft tube to be expanded radially outwardly. This radial expansion or bulge of the transition member and the hollow cylindrical driveshaft tube creates an axially weakened region therein at a predetermined location on the driveshaft assembly. Consequently, when the slip yoke and the wedge are moved yet axially further relative to the transition member, the driveshaft tube is further deformed in a controlled and consistent, thereby absorbing energy from the collision. Optionally, a bladder may be provided within the hollow cylindrical driveshaft tube and filled with a material so as to allow the amount of compressive force that is required to cause the driveshaft assembly to axially collapse in the manner described above to be varied.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a side elevational view, partially in cross section, of an axially collapsible drive shaft assembly in accordance with this invention shown prior to the onset of axially collapsing movement.

FIG. 2 is a side elevational view, similar to FIG. 1, showing the axially collapsible driveshaft assembly at an initial stage of axially collapsing movement.

DETAILED DESCRIPTION OF THE PREFERRED EMBODIMENT

Figure 3:
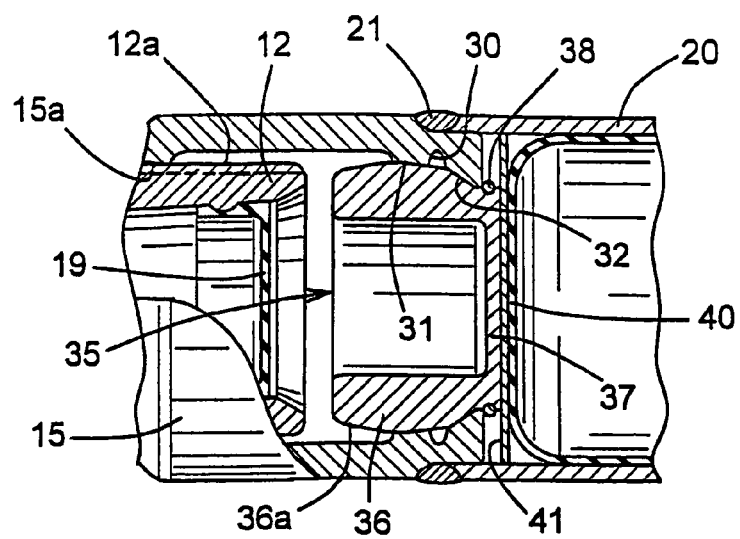
FIG. 3 is an enlarged side elevational view of a portion of the axially collapsible driveshaft assembly illustrated in FIG. 1 shown prior to the onset of axially collapsing movement.

Referring now to the drawings, there is illustrated in FIGS. 1 and 2 an axially collapsible driveshaft assembly, indicated generally at 10, in accordance with this invention. The driveshaft assembly 10 may, for example, be used in a drive train system of a vehicle to transmit rotational power from an engine/transmission assembly (not shown) to a plurality of driven wheels (not shown), such as in the manner described above. The illustrated driveshaft assembly 10 is, in large measure, conventional in the art and is intended merely to illustrate one environment in which this invention may be used. Thus, the scope of this invention is not intended to be limited for use with the specific structure for the driveshaft assembly 10 illustrated in FIG. 1 or with vehicle drive train systems in general. On the contrary, as will become apparent below, this invention may be used in any desired environment for the purposes described below.

The illustrated driveshaft assembly 10 includes a slip yoke 11 having a hollow cylindrical sleeve portion 12 and a pair of opposed yoke arms 13. A conventional cross assembly, indicated generally at 14, is connected to the opposed yoke arms 13 of the slip yoke 11 and is adapted to form a portion of a first conventional universal joint. A plurality of outwardly extending male splines 12a are formed or otherwise provided on the outer surface of the sleeve portion 12 of the slip yoke 11. The sleeve portion 12 of the slip yoke 11 extends co-axially within a first end of a hollow cylindrical transition member 15 of the driveshaft assembly 10. A plurality of inwardly extending female splines 15a are formed or otherwise provided on the inner surface of the first end of the transition member 15. The outwardly extending male splines 12a provided sleeve portion 12 of the slip yoke 11 cooperate in a conventional manner with the inwardly extending female splines 15a provided on the transition member 15 such that the slip yoke 11 and the transition member 15 are connected together for concurrent rotational movement, while a limited amount of axial movement is permitted to occur therebetween.

An external sealing assembly is provided to prevent dirt, water, and other contaminants from entering into the region of the cooperating splines 12a and 15a of the slip yoke 11 and the transition member 15 from the exterior of the driveshaft assembly 10. The external sealing assembly includes a hollow cylindrical cover 16 having a first end that is press fit or otherwise secured to the slip yoke 11 and a second end that extends co-axially about the first end of the transition member 15. The external sealing assembly also includes a flexible boot 17 having a first end that is connected to the second end of the hollow cylindrical cover 16 and a second end that is connected to the transition member 15. In a manner that is well known in the art, the flexible boot 17 can axially expand and contract so as to accommodate relative axial movement between the slip yoke 11 and the transition member 15, while maintaining a reliable seal therebetween to prevent contaminants from entering into the region of the cooperating splines 12a and 15a of the slip yoke 11 and the transition member 15 from the exterior of the driveshaft assembly 10. If desired, a conventional weld ring 18 may be supported on the outer surface of the hollow cylindrical cover 16 to facilitate the securement of one or more balance weights (not shown) thereto to balance the driveshaft assembly 10 for rotation in a conventional manner.

An internal sealing assembly is also provided to prevent dirt, water, and other contaminants from entering into the region of the cooperating splines 12a and 15a of the slip yoke 11 and the transition member 15 from the interior of the driveshaft assembly 10. The internal sealing assembly includes a hollow cylindrical sealing cup 19 that is press fit or otherwise secured to inner surface of the sleeve portion 12 of the slip yoke 11. In a manner that is well known in the art, the sealing cup 19 prevents contaminants from passing through the sleeve portion 12 of the slip yoke 11 into the region of the cooperating splines 12a and 15a.

A second end of the transition member 15 is secured to a first end of a hollow cylindrical driveshaft tube 20 in a conventional manner, such as by a weld 21. A second end of the driveshaft tube 20 is secured to a tube yoke 22 in a conventional manner, such as by a weld 23. The tube yoke 22 includes a hollow cylindrical sleeve portion 24 that extends within the second end of the driveshaft tube 20 and a pair of opposed yoke arms 25. A conventional cross assembly, indicated generally at 26, is connected to the opposed yoke arms 25 of the tube yoke 22 and is adapted to form a portion of a second conventional universal joint.

As best shown in FIG. 3, the second end of the transition member 15 has an inner surface that tapers or otherwise extends radially inwardly. In the illustrated embodiment, the wall thickness of the second end of the transition member 15 is somewhat enlarged, thereby defining the inwardly extending inner surface. More specifically, the enlarged second end of the transition member 15 has an annular groove 30 formed or otherwise provided in the inwardly extending inner surface that defines first and second inwardly extending lip portions 31 and 32. The first and second lip portions 31 and 32 define respective inner surfaces, and the inner surface defined by the first lip portion 31 is slightly larger than the inner surface defined by the second lip portion 32.

A wedge, indicated generally at 35, is supported within the second end of the transition member 15. In the illustrated embodiment, the wedge 35 is a generally cup-shaped member including a generally hollow cylindrical wall portion 36 and a generally flat annular end wall portion 37. However, the wedge 35 may be formed having any desired shape. The hollow cylindrical wall portion 36 has an outer surface 36a that is tapered or otherwise extends radially outwardly. As best shown in FIG. 3, the tapered outer surface 36a of the wedge 35 is disposed within the tapered inner surfaces 31 and 32 of the second end of the transition member 15 and engages the inwardly extending inner surface provided thereon. The wedge 35 may, if desired, be positively retained within the second end of the transition member 15 in any desired manner. For example, the wedge 35 may be installed within the second end of the transition member 15 in a press fit or snap fit relationship. Alternatively, a portion of the second end of the transition member 15 may be deformed, such as by staking, magnetic pulse forming, mechanical crimping, or roll forming, so as to positively engage a portion of the outer surface of the wedge 35. Thus, the wedge 35 is supported within the second end of the transition member 15. If desired, an O-ring 38 or similar sealing structure may be provided to prevent dirt, water, and other contaminants from passing between the tapered outer surface 36a of the wedge 35 and the tapered inner surfaces 31 and 32 of the second end of the transition member 15 into the region of the cooperating splines 12a and 15a of the slip yoke 11 and the transition member 15.

Optionally, a mechanism is provided for varying the amount of compressive force that is required to cause the driveshaft assembly 10 to axially collapse in the manner described above. In the illustrated embodiment, this mechanism is a bladder 40 that is provided within the hollow cylindrical driveshaft tube 20. The bladder 40 is preferably formed from a relatively flexible material, such as an elastomeric material. However, the bladder 40 may be formed from any desired material. The bladder 40 may be filled, either partially or fully, with a quantity of any desired material. This material may be either a solid material (such as, for example, an open or closed cell material or a solid foam material), a liquid material (such as, for example, a liquid foam material, a gelatinous material, a silicone material, water, or grease), or a gaseous material (such as, for example, air). The bladder 40 may, if desired, be disposed within a chamber defined within the hollow cylindrical driveshaft tube 20 by a pair of plates 41 and 42. The plates 41 and 42 can be formed from any desired material and can be supported within the hollow cylindrical driveshaft tube 20 in any desired manner. In the illustrated embodiment, the first plate 41 abuts the end of the wedge 35, while the second plate 42 abuts the end of the sleeve portion 24 of the tube yoke 22. The purpose for the optional bladder 40 and the plates 41 and 42 will be explained in detail below.

The operation of the driveshaft assembly 10 will now be described. As discussed above, the driveshaft assembly 10 may be used in a drive train system of a vehicle to transmit rotational power from an engine/transmission assembly (not shown) to a plurality of driven wheels (not shown). As also discussed above, the slip yoke 11 and the transition member 15 are connected together for concurrent rotational movement, while a limited amount of axial movement is permitted to occur therebetween. During normal operation of the driveshaft assembly 10, the end of the hollow cylindrical sleeve portion 12 of the slip yoke 11 is spaced apart from the generally hollow cylindrical wall portion 36 of the wedge 35, as shown in FIG. 3.

Figure 4:
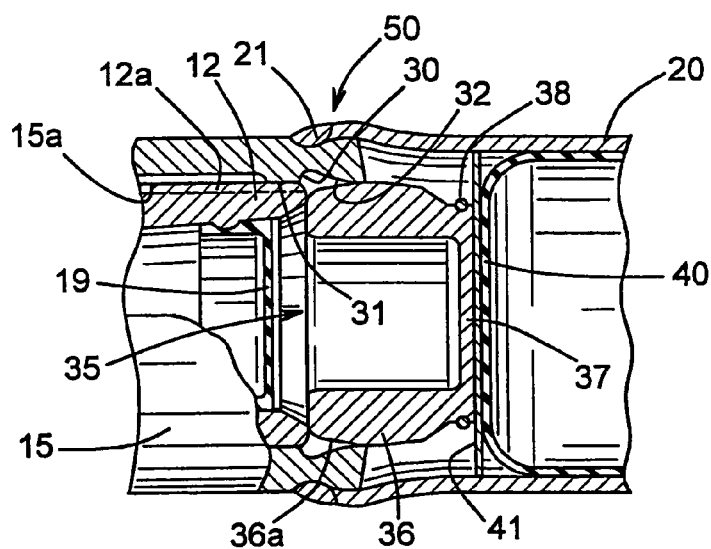
FIG. 4 is an enlarged side elevational view of a portion of the axially collapsible driveshaft assembly illustrated in FIG. 2 at an initial stage of axially collapsing movement.

When a large compressive force is applied to the ends of the driveshaft assembly 10, such as might occur during a collision, the slip yoke 11 is initially moved axially within the transition member 15 until the end of the sleeve portion 12 of the slip yoke 11 abuts the generally hollow cylindrical wall portion 36 of the wedge 35, as shown in FIGS. 1 and 3. Further axial movement of the slip yoke 11 relative to the transition member 15 causes the wedge 35 to move axially also relative to the transition member 15. As a result of the engagement between the tapered outer surface 36a of the wedge 35 and the tapered inner surfaces 31 and 32 of the second end of the transition member 15, such further axial movement of the slip yoke 11 and the wedge 35 causes the second end of the transition member 15 to be expanded radially outwardly, as shown generally at 50 in FIGS. 2 and 4.

Figure 5:
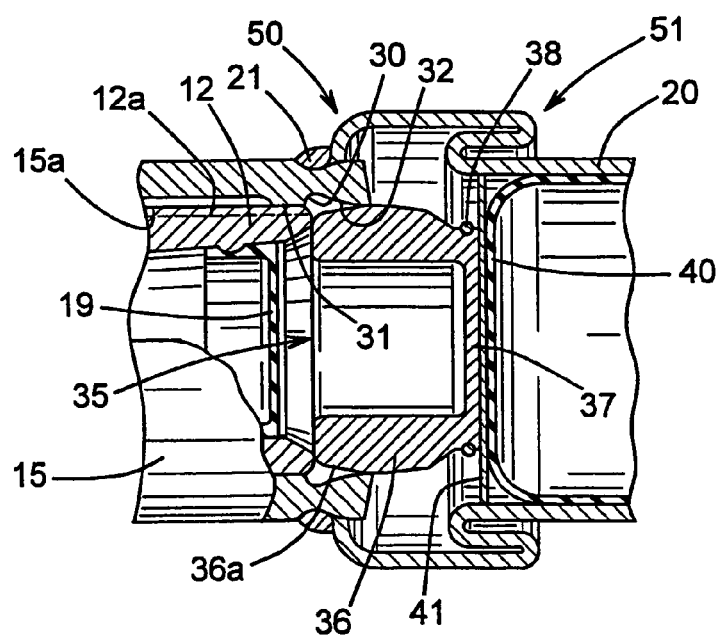
FIG. 5 is an enlarged side elevational view of a portion of the axially collapsible driveshaft assembly shown at a subsequent stage of axially collapsing movement.

Because it is welded to the second end of the transition member 15, the first end of the hollow cylindrical driveshaft tube 20 is also expanded radially outwardly. This radial expansion or bulge 50 of the second end of the transition member 15 and the first end of the hollow cylindrical driveshaft tube 20 creates an axially weakened region therein that is located at predetermined positions on the transition member 15 and the driveshaft tube 20. Consequently, when the slip yoke 11 and the wedge 35 are moved yet axially further relative to the transition member 15, the first end of the driveshaft tube 20 is further deformed, as shown generally at 51 in FIG. 5. Because of the cooperation of the wedge 35 with the second end of the transition member 15, such additional deformation will occur consistently at the same location within the driveshaft assembly 10. Also, energy from the collision is effectively absorbed by the driveshaft assembly 10 by virtue of the deformation 50 and 51.

The amount of energy that is required to cause the driveshaft assembly 10 to axially collapse in the manner described above is dependent upon a number of factors, including, for example, the size and type of the material that is used to form the various components thereof. The bladder 40 described above may be used to define an additional or predetermined amount of force that is required to initiate the axially collapsing movement of the driveshaft assembly 10. As discussed above, the bladder 40 is preferably formed from a relatively flexible material and is filled, either partially or fully, with a quantity of a material. Thus, a certain amount of energy is required to axially collapse the bladder 40 and the material contained therein. As also discussed above, the bladder 40 is disposed within a chamber defined within the hollow cylindrical driveshaft tube 20 by the first plate 41 (which abuts the end of the wedge 35) and the second plate 42 (which abuts the end of the sleeve portion 24 of the tube yoke 22). Thus, the bladder 40 reacts between the wedge 35 (which, during a collision, is attempted to be moved axially relative to the transition member 15) and the sleeve portion 24 of the tube yoke 22 (which essentially is immovable during the collision). By varying the amount and nature of the material that is contained within the bladder 40, the amount of compressive force that is required to cause the driveshaft assembly 10 to axially collapse in the manner described above can be varied.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A driveshaft assembly comprising:
   first and second components that are connected together for concurrent rotational movement and for relative axial movement;
   a wedge disposed within said second component and adapted to be engaged by said first component so as to create an axially weakened region in said second component when said first component is moved axially relative to said second component, wherein said first and second components can move relative to one another by a predetermined amount without engaging said wedge; and
   a mechanism for varying the amount of force that is required to cause said first component to be moved axially relative to said second component, said mechanism including a bladder.

2. The driveshaft assembly defined in claim 1 wherein said first and second components have respective pluralities of splines formed therein that cooperate with one another.

3. The driveshaft assembly defined in claim 1 wherein said first component is a slip yoke having a male splined portion, and wherein said second component is a hollow member having a female splined portion, said male and female splined portions cooperating with one another.

4. The driveshaft assembly defined in claim 1 wherein said first component is a slip yoke having a male splined portion, and wherein said second component is a hollow transition member having a female splined portion and a driveshaft tube that is secured to said transition member, said male and female splined portions cooperating with one another.

5. The driveshaft assembly defined in claim 1 wherein said second component has an inwardly extending surface provided thereon, and wherein said wedge engages said inwardly extending surface to create said axially weakened region.

6. The driveshaft assembly defined in claim 1 wherein said wedge has an outwardly extending surface provided thereon, and wherein said outwardly extending surface of said wedge engages said second component to create said axially weakened region.

7. The driveshaft assembly defined in claim 1 wherein said second component has an inwardly extending surface provided thereon and said wedge has an outwardly extending surface provided thereon, and wherein said outwardly extending surface of said wedge engages said inwardly extending surface of said second component to create said axially weakened region.

8. The driveshaft assembly defined in claim 1 wherein said bladder is formed from a resilient material.

9. The driveshaft assembly defined in claim 8 wherein said bladder is partially filled with a material.

10. The driveshaft assembly defined in claim 8 wherein said bladder is fully filled with a material.

11. The driveshaft assembly defined in claim 8 wherein said bladder contains one of an open cell material, a closed cell material, a solid foam material, a liquid foam material, a gelatinous material, a silicone material, water, grease, and air.

12. The driveshaft assembly defined in claim 8 wherein said bladder is disposed within a chamber defined within said second component.

13. The driveshaft assembly defined in claim 12 wherein said chamber is defined within said second component by a pair of plates that are secured to said second component.

14. A driveshaft assembly comprising:
first and second components that are connected together for concurrent rotational movement and for relative axial movement;
a wedge disposed within said second component and adapted to be engaged by said first component and moved relative to said second component so as to create an axially weakened region in said second component when said first component is moved axially relative to said second component by more than a predetermined amount; and
a mechanism for varying the amount of force that is required to cause said wedge to be moved relative to said second component, said mechanism including a bladder.

15. The driveshaft assembly defined in claim 14 wherein said first and second components have respective pluralities of splines formed therein that cooperate with one another.

16. The driveshaft assembly defined in claim 14 wherein said first component is a slip yoke having a male splined portion, and wherein said second component is a hollow member having a female splined portion, said male and female splined portions cooperating with one another.

17. The driveshaft assembly defined in claim 14 wherein said first component is a slip yoke having a male splined portion, and wherein said second component is a hollow transition member having a female splined portion and a driveshaft tube that is secured to said transition member, said male and female splined portions cooperating with one another.

18. The driveshaft assembly defined in claim 14 wherein said second component has an inwardly extending surface provided thereon, and wherein said wedge engages said inwardly extending surface to create said axially weakened region.

19. The driveshaft assembly defined in claim 14 wherein said wedge has an outwardly extending surface provided thereon, and wherein said outwardly extending surface of said wedge engages said second component to create said axially weakened region.

20. The driveshaft assembly defined in claim 14 wherein said second component has an inwardly extending surface provided thereon and said wedge has an outwardly extending surface provided thereon, and wherein said outwardly extending surface of said wedge engages said inwardly extending surface of said second component to create said axially weakened region.

21. The driveshaft assembly defined in claim 14 wherein said bladder is formed from a resilient material.

22. The driveshaft assembly defined in claim 14 wherein said bladder is partially filled with a material.

23. The driveshaft assembly defined in claim 14 wherein said bladder is fully filled with a material.

24. The driveshaft assembly defined in claim 14 wherein said bladder contains one of an open cell material, a closed cell material, a solid foam material, a liquid foam material, a gelatinous material, a silicone material, water, grease, and air.

25. The driveshaft assembly defined in claim 14 wherein said bladder is disposed within a chamber defined within said second component.

26. The driveshaft assembly defined in claim 25 wherein said chamber is defined within said second component by a pair of plates that are secured to said second component.

* * * * *